(12) United States Patent
Watanabe et al.

(10) Patent No.: US 8,929,113 B2
(45) Date of Patent: Jan. 6, 2015

(54) CAPACITOR DISCHARGER FOR POWER CONVERSION SYSTEM

(75) Inventors: Kazunori Watanabe, Kariya (JP); Tsuneo Maebara, Nagoya (JP)

(73) Assignee: Denso Corporation, Kariya (JP)

( * ) Notice: Subject to any disclaimer, the term of this patent is extended or adjusted under 35 U.S.C. 154(b) by 114 days.

(21) Appl. No.: 13/568,469

(22) Filed: Aug. 7, 2012

(65) Prior Publication Data
US 2013/0039108 A1   Feb. 14, 2013

(30) Foreign Application Priority Data
Aug. 8, 2011 (JP) .................................. 2011-172552

(51) Int. Cl.
  H02M 7/537 (2006.01)
  H02M 7/48 (2006.01)
  H02M 1/32 (2007.01)
(52) U.S. Cl.
  CPC .......... *H02M 7/48* (2013.01); *H02M 2001/322* (2013.01); *Y02T 10/7225* (2013.01); *B60L 2210/14* (2013.01)
  USPC ........................................................ 363/131
(58) Field of Classification Search
  CPC ...................................................... H02M 7/48
  USPC ............ 363/131, 16, 34, 51, 56.08, 109, 117, 363/124; 320/166, 167
  See application file for complete search history.

(56) References Cited

U.S. PATENT DOCUMENTS

| 5,570,257 A | * | 10/1996 | Manning et al. ................ 361/76 |
| 6,111,437 A | * | 8/2000 | Patel ................................. 327/74 |
| 2010/0039039 A1 | * | 2/2010 | Goriki et al. ................... 315/246 |

FOREIGN PATENT DOCUMENTS

| JP | 2005-253276 | 9/2005 |
| JP | 2006-304414 | 11/2006 |
| JP | 2007-312456 | 11/2007 |
| JP | 2009-247065 | 10/2009 |
| JP | 2011-210026 | 10/2011 |

OTHER PUBLICATIONS

Office Action (2 pages) dated Jul. 16, 2013, issued in corresponding Japanese Application No. 2011-172552 and English translation (2 pages).

* cited by examiner

*Primary Examiner* — Gary L Laxton
*Assistant Examiner* — Trinh Dang
(74) *Attorney, Agent, or Firm* — Nixon & Vanderhye P.C.

(57) ABSTRACT

A capacitor discharger applied to a power conversion system including a DC voltage source, a power conversion circuit having a pair of input terminals via which the DC voltage source is electrically connected to the power conversion circuit, and a capacitor electrically connected between the pair of input terminals of the power conversion circuit. The capacitor discharger includes a first series connection of resistive elements and a second series connection of resistive elements. In the capacitor discharger, a parallel connection of the first and second series connections of resistive elements is electrically connected between the pair of input terminals of the power conversion circuit. This can ensure a discharge path for discharging the capacitor even in the presence of an abnormality in a portion of the parallel connection of the first and second series connections of resistive elements.

8 Claims, 8 Drawing Sheets

FIG.7

|  | Vout1 | Vout2 | Vout3 | Vout4 |
|---|---|---|---|---|
| NORMAL OPERATION | L | L | L | L |
| OPEN FAULT IN A1 OR IN B2 | (H) | L | L | L |
| OPEN FAULT IN A2 | L | (H) | H | L or H |
| OPEN FAULT IN B1 | L | (H) | L or H | H |
| OPEN FAULT IN A3 | L | (L) | (H) | L |
| OPEN FAULT IN B3 | L | (L) | L | (H) |

US 8,929,113 B2

CAPACITOR DISCHARGER FOR POWER CONVERSION SYSTEM

CROSS-REFERENCE TO RELATED APPLICATION

This application is based on and claims the benefit of priority from earlier Japanese Patent Application No. 2011-172552 filed Aug. 8, 2011, the description of which is incorporated herein by reference.

BACKGROUND

1. Technical Field

This invention relates to a capacitor discharger applied to a power conversion system including a direct-current (DC) voltage source, a power conversion circuit having a pair of input terminals via which the DC voltage source is electrically connected to the power conversion circuit, and a capacitor electrically connected between the pair of input terminals of the power conversion circuit.

2. Related Art

A power conversion system as disclosed in Japanese Patent Application Laid-Open Publication No. 2005-253276 includes a battery, an inverter, a capacitor, and a discharge resistive element, where the battery is electrically connected in parallel with the inverter, with the capacitor, and with the discharge resistive element via a switch. The capacitor is operable to suppress a fluctuation in voltage between a pair of input terminals of the inverter. The discharge resistive element is operable to discharge the capacitor when the switch is in its off state in which the battery and the inverter are electrically disconnected from each other.

In the disclosed power conversion system, however, an abnormality, such as a disconnection (referred to as an open fault) or the like, in the discharge resistive element may prevent the capacitor from being discharged.

In consideration of the foregoing, exemplary embodiments of the present invention are directed to providing a capacitor discharger applied to a power conversion system such that, even in the presence of an abnormality in a discharge resistive element, a discharge path for discharging a capacitor can be ensured.

SUMMARY

In accordance with an exemplary embodiment of the present invention, there is provided a capacitor discharger for a power conversion system including a DC voltage source, a power conversion circuit having a pair of input terminals via which the DC voltage source is electrically connected to the power conversion circuit, and a capacitor electrically connected between the pair of input terminals of the power conversion circuit. The capacitor discharger includes: a first series connection of resistive elements; and a second series connection of resistive elements, where a parallel connection of the first and second series connections of resistive elements is electrically connected between the pair of input terminals of the power conversion circuit.

In the above embodiment, a pair of series connections of resistive elements, each of which is a series connection of a plurality of resistive elements, are electrically connected in parallel between a pair of input terminals of the power conversion circuit. Therefore, for example, even in the presence of an open fault in a portion of the parallel connection of the pair of series connections of resistive elements, a discharge path for the capacitor can be ensured.

In addition, in the above embodiment, a discharge path for the capacitor is formed of the pair of series connections of resistive elements. This may lead to efficient dissipation of heat generated by a current flowing through each series connection of resistive elements and may ensure a sufficient insulation distance between a pair of terminals of each series connection of resistive elements.

BRIEF DESCRIPTION OF THE DRAWINGS

In the accompanying drawings:

FIG. 7 schematically shows an abnormality determination process in accordance with the fourth embodiment;

DESCRIPTION OF SPECIFIC EMBODIMENTS

The present invention will be described more fully hereinafter with reference to the accompanying drawings. Like numbers refer to like elements throughout.

First Embodiment

There will now be explained a power conversion system in accordance with a first embodiment of the present invention with reference to FIG. 1, to which a capacitor discharger of the present invention is applied. The power conversion system is electrically connected to a main rotating machine for a hybrid vehicle.

Figure 1:
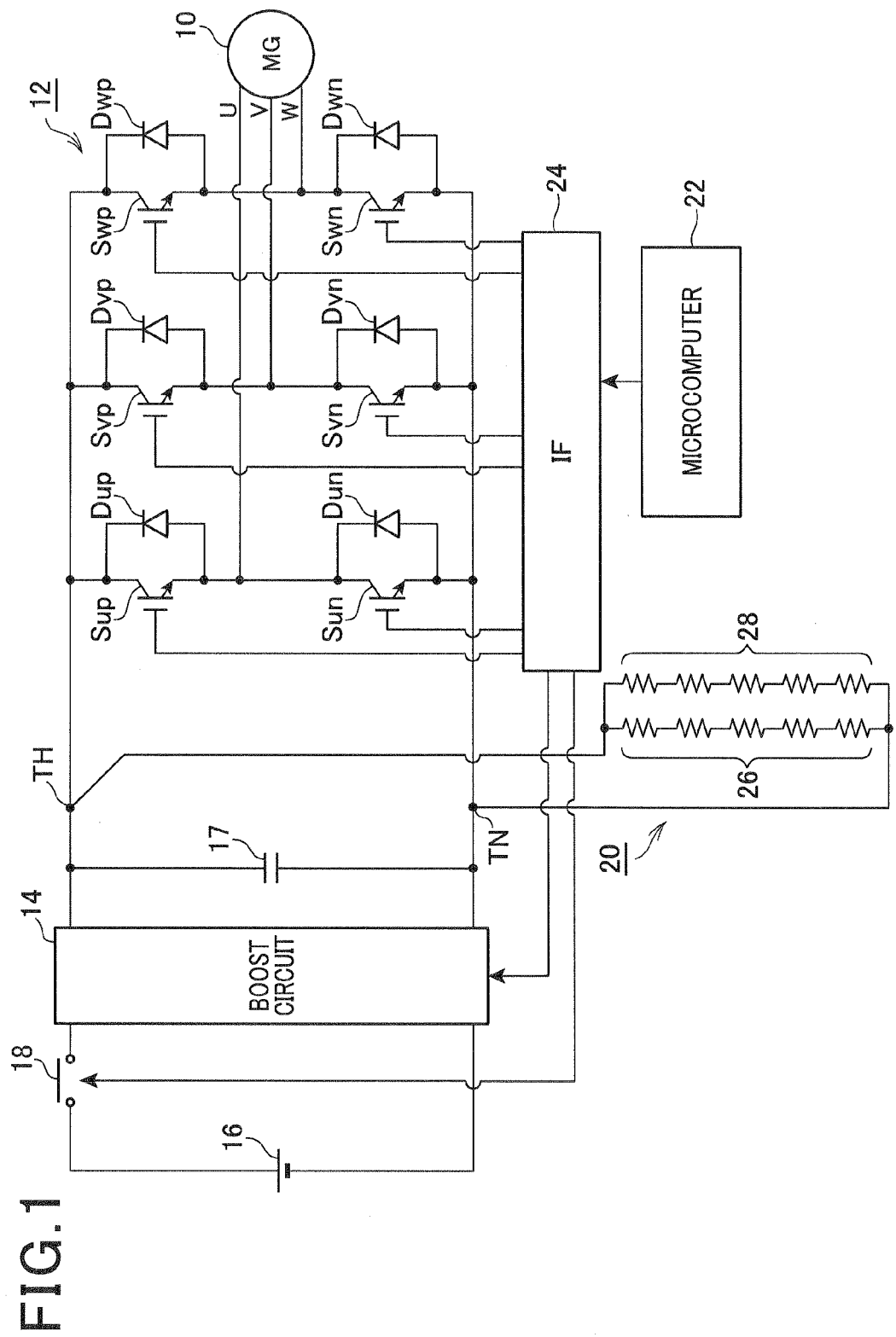
FIG. 1 schematically shows a power conversion system in accordance with a first embodiment of the present invention.

FIG. 1 schematically shows the power conversion system of the first embodiment.

As shown in FIG. 1, a motor-generator 10, as a prime mover for a vehicle, is mechanically connected to a drive wheel (not shown). The motor-generator 10 is electrically connected to a high-voltage battery 16 via an inverter 12 and via a boost circuit 14.

More specifically, the high-voltage battery 16 may be a secondary battery whose terminal voltage is equal to or greater than 100 V. The boost circuit 14 includes a series connection of a pair of switching elements (not shown), a capacitor 17 (referred to as a smoothing capacitor) electrically connected in parallel with the series connection of switching elements to suppress a fluctuation in output voltage of the inverter 12, and a reactor (not shown). The boost circuit 14 is operable to step up a DC voltage of the high-voltage battery 16 up to a predetermined DC voltage (e.g., 650 V) by operating the switching elements.

In practice, as described above, the capacitor 17 is included in the boost circuit 14, but the capacitor 17 is depicted outside the boost circuit 14 for illustration purposes only. In addition, a relay 18 is provided between the high-voltage battery 16 and the boost circuit 14 to connect or disconnect therebetween.

A pair of output terminals of the boost circuit 14 are each electrically connected to a respectively corresponding one of a pair of input terminals of the inverter 12. The inverter 12 includes a pair of switching elements Sup, Sun electrically connected in series at a first junction (a first series connection of switching elements), a pair of switching elements Svp, Svn electrically connected in series at a second junction (a second series connection of switching elements), and a pair of switching elements Swp, Swn electrically connected in series at a third junction (a third series connection of switching elements). The first to third junctions of the respective series connections of switching elements are electrically connected to the U-, V-, and W-phase terminals of the motor-generator 10, respectively. In the present embodiment, each of the switching elements sap ($\alpha$=u,v,w, $\beta$=p,n) is an insulated gate bipolar transistor (IGBT) and is electrically connected in anti-parallel with a respectively corresponding diode D$\alpha\beta$ ($\alpha$=u,v,w, $\beta$=p,n).

A discharge circuit 20 is electrically connected between the pair of input terminals of the inverter 12. The discharge circuit 20 is operable to discharge the capacitor 17 in an emergency if a discharge control process (which will be described later) is unable to be performed.

A microcomputer 22 is operable to control a controlled variable, such as a torque, of the motor-generator 10 by operating the inverter 12. The microcomputer 22 controls an output voltage of the boost circuit 14 by operating the switching elements of the boost circuit 14. More specifically, the microcomputer 22 operates the inverter 12 and the boost circuit 14 by outputting an operation signal to each of the switching elements of the inverter 12 and the switching elements of the boost circuit 14 via an interface 24 including electrically insulating means, such as a photocoupler, and via a drive circuit (not shown). The insulating means of the interface 24 allows a vehicle-mounted high-voltage system including the inverter 12 and the high-voltage battery 16 and a vehicle-mounted low-voltage system including the microcomputer 22 to be isolated electrically from each other.

The microcomputer 22 performs the discharge control process, in which the capacitor 17 is discharged when the relay 18 is in its off state (open state) where the high-voltage battery 16 and the boost circuit 14 are disconnected from each other for purposes of ensuring safety for later vehicle maintenance or the like. In the discharge control process according to the present embodiment, the inverter 12 is operated so that a reactive current flows through the motor-generator 10, that is, a torque produced by the motor-generator 10 becomes zero. Such a discharge control process allows the capacitor 17 to be discharged rapidly.

The power conversion system may be damaged by a vehicle collision or the like. More specifically, for example, power supply to the microcomputer 22 may be interrupted, or a circuit board on which the switching elements S$\alpha\beta$ are mounted may be damaged. Once the power conversion system is damaged, the inverter 12 may become unable to be electrically operated properly, which may prevent the discharge control process from being performed. To cope with such emergencies, the discharge circuit 20 is provided. However, it should be noted that an abnormality may also occur in the discharge circuit 20.

To avoid such a problem, in the present embodiment, the discharge circuit 20 includes a parallel connection of a pair of series connections of resistive elements so that, even in the presence of an abnormality in the discharge circuit 20, the capacitor 17 can be discharged properly.

More specifically, the discharge circuit 20 includes a pair of high resistance resistors 26, 28 electrically connected in parallel with each other, each of which is a series connection of resistive elements (a series connection of five resistive elements in the present embodiment).

A pair of terminals of each of the high resistance resistors 26, 28 are electrically connected to a positive input terminal TH of the inverter 12 (that is also a positive terminal of the capacitor 17) and a negative input terminal TN of the inverter 12 (that is also a negative terminal of the capacitor 17), respectively.

In the present embodiment, the high resistance resistors 26, 28 are formed of a mutually equal number of resistive elements (five resistive elements in the present embodiment). A resistance value of each of the resistive elements forming the high resistance resistor 26 is equal to a resistance value of a respectively corresponding one of the resistive elements forming the high resistance resistor 28. A total resistance value of each of the high resistance resistors 26, 28 may be set at several k$\Omega$.

With this configuration, for example, even in the presence of an open fault in one of the high resistance resistors 26, 28, a discharge path for the capacitor 17 can be ensured by the other high resistance resistor.

There are two main reasons why the high resistance resistors 26, 28 are each formed not of a single resistive element, but of a series connection of a plurality of resistive elements. One reason is that a smaller resistance value for each of the resistive elements forming each high resistance resistor may lead to more efficient dissipation of heat generated by a current flowing through the high resistance resistor.

The other reason is that a sufficient insulation distance between a pair of terminals of each of the high resistance resistors 26, 28 can be ensured more easily as compared to an embodiment where each high resistance resistor is formed of a single resistive element. When each high resistance resistor is formed of a single resistive element, it is probably difficult to make an elongated resistive element of a resistive material. Therefore, it is advantageous to furnish a sufficient insulation length as a sum insulation length of the plurality of resistive elements for each high resistance resistor.

The power conversion system in accordance with the first embodiment provides the following advantages.

(1) A parallel connection of a pair of high resistance resistors 26, 28 is electrically connected between a pair of input terminals of the inverter 12. With this configuration, even in the presence of an open fault in one of the high resistance resistors 26, 28, at least one discharge path for the capacitor 17 can be ensured by the other high resistance resistor. That is, duplicated discharge paths are provided for the capacitor 17, which leads to enhancement of reliability of the discharge circuit 20 for the capacitor 17.

(2) The high resistance resistors 26, 28 are each formed of a series connection of a plurality of resistive elements. This can lead to efficient dissipation of heat generated in each high resistance resistor by a current flowing through the high resistance resistor and ensure a sufficient insulation distance between a pair of terminals of each high resistance resistor in a cost-effective manner.

Second Embodiment

There will now be explained a power conversion system in accordance with a second embodiment of the present invention. Only differences of the second embodiment from the first embodiment will be explained.

Figure 2:
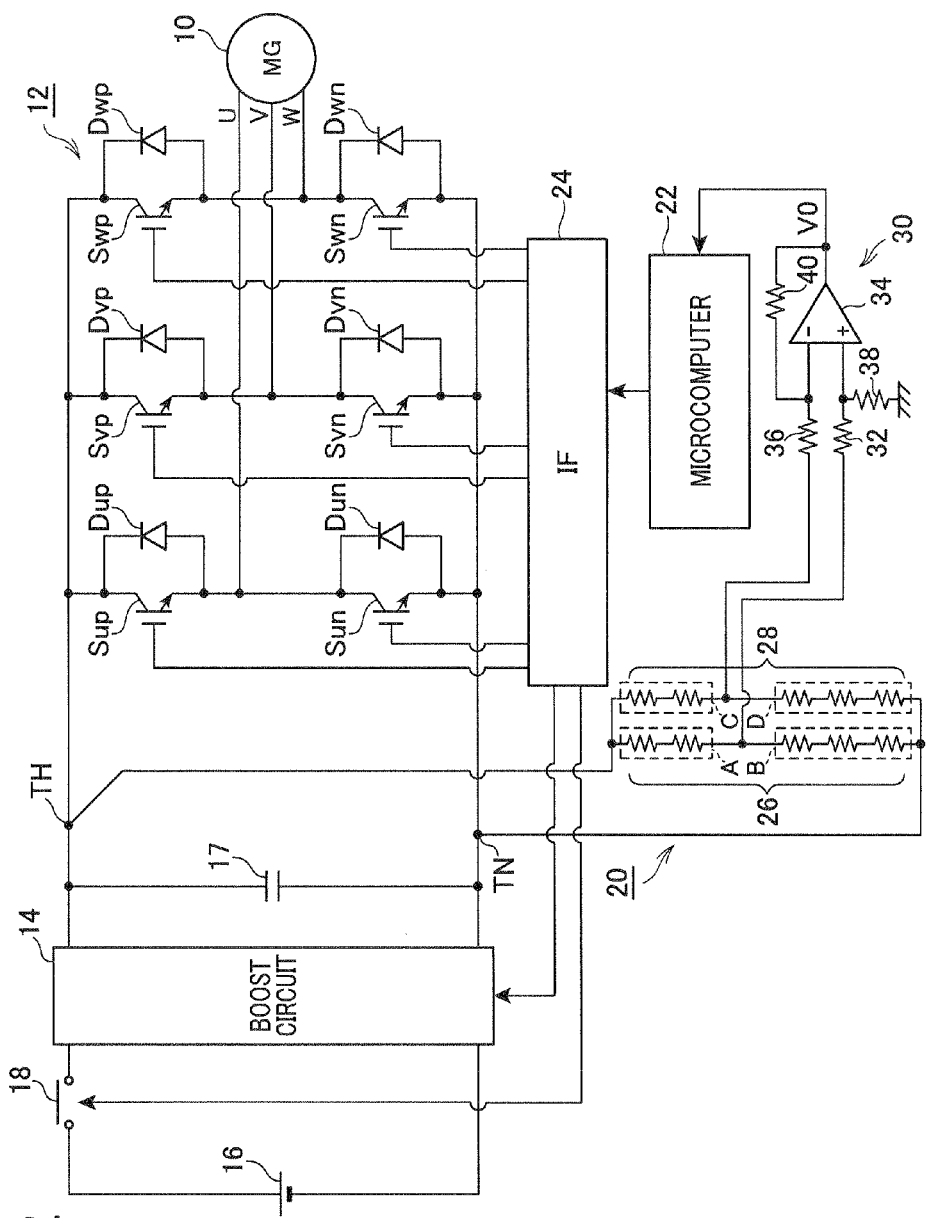
FIG. 2 schematically shows a power conversion system in accordance with a second embodiment of the present invention.

FIG. 2 schematically shows a power conversion system in accordance with the second embodiment.

As shown in FIG. 2, a specific one of junctions of resistive elements of the high resistance resistor 26 and a specific one of junctions of resistive elements of the high resistance resistor 28 are both electrically connected to a differential amplifier circuit 30. More specifically, the $n^{th}$ junction of resistive elements (n=2 in the present embodiment), from the high side or from the positive input terminal TH side, of the high resistance resistor 26 that is a junction of the $n^{th}$ resistive element and the $(n+1)^{th}$ resistive element included in the high resistance resistor 26 is electrically connected to a non-inverting input terminal of the operational amplifier 34 through a resistive element 32, and the $n^{th}$ junction of resistive elements (n=2 in the present embodiment), from the high side or from the positive input terminal TH side, of the high resistance resistor 28 that is a junction of the $n^{th}$ resistive element and the $(n+1)^{th}$ resistive element included in the high resistance resistor 28 is electrically connected to an inverting input terminal of the operational amplifier 34 through a resistive element 36.

A junction of the resistive element 32 and the non-inverting input terminal of the operational amplifier 34 is electrically connected to ground through a resistive element 38. The inverting input terminal of the operational amplifier 34 is electrically connected to an output terminal of the operational amplifier 34 through a resistive element 40. The output terminal of the operational amplifier 34 is electrically connected to the microcomputer 22.

In the present embodiment, the high resistance resistor 26 is divided into two resistors by the second junction of resistive elements, where one is a high-side resistor A that is a series connection of two resistive elements between the positive input terminal TH and the second junction and the other is a low-side resistor B that is a series connection of three resistive elements between the second junction and the negative input terminal TN. The high resistance resistor 28 is also divided into two resistors by the second junction of resistive elements, where one is a high-side resistor C that is a series connection of two resistive elements between the positive input terminal TH and the second junction and the other is a low-side resistor D that is a series connection of three resistive elements between the second junction and the negative input terminal TN.

The microcomputer 22 (an abnormality determination unit) receives an output voltage V0 from the differential amplifier circuit 30 and performs an abnormality determination process for the parallel connection of high resistance resistors 26, 28 forming the discharge circuit 20 on the basis of the received output voltage V0. The abnormality determination process will now be explained.

Figure 3:
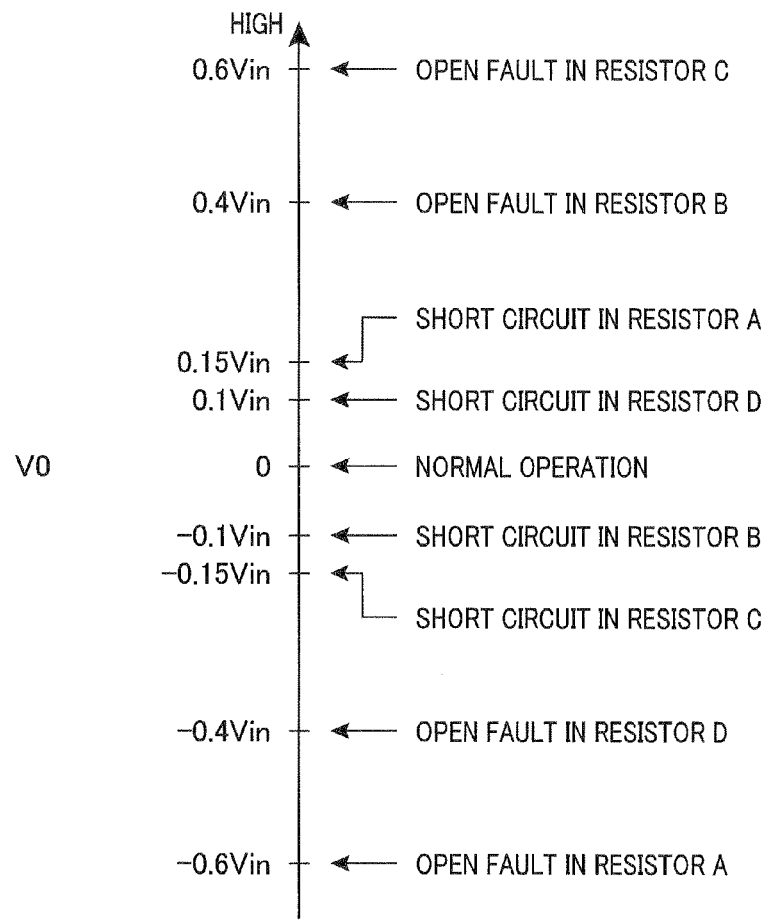
FIG. 3 schematically shows an abnormality determination process in accordance with the second embodiment.

FIG. 3 shows a correspondence relation between various abnormalities and output voltages V0 of the differential amplifier circuit 30, which is used in the abnormality determination process for the parallel connection of high resistance resistors 26, 28, where Vin is an input voltage of the inverter 12 (that is also a charging voltage of the capacitor 17) and a gain of the differential amplifier circuit 30 is unity.

As shown in FIG. 3, when the high resistance resistors 26, 28 are both in a normal state (there exist no abnormalities in either of them), the output voltage V0 of the differential amplifier circuit 30 is zero as there is no potential difference between the inverting input and non-inverting terminals of the operational amplifier 34.

When there exists an abnormality in a portion, for example, one of the resistors A to D, of the parallel connection of high resistance resistors 26, 28, the output voltage V0 of the differential amplifier circuit 30 differs from zero. In other words, when it is determined that the output voltage V0 of the differential amplifier circuit 30 is different from zero, then it can be determined that there exists an abnormality in at least one portion of the parallel connection of high resistance resistors 26, 28. As an example, as shown in FIG. 3, when the microcomputer 22 has received an output voltage V0 of 0.6 Vin (0.6 times Vin) from the differential amplifier circuit 30, then it can be determined that there exists an open fault in the resistor C.

Figure 4:
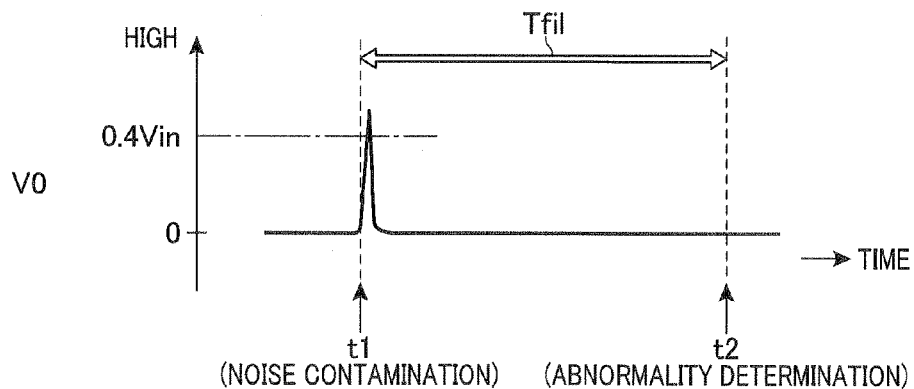
FIG. 4 schematically shows an exemplary timing at which the abnormality determination process is performed in accordance with the second embodiment.

In the present embodiment, as shown in FIG. 4, the abnormality determination process is performed by using an output voltage V0 of the differential amplifier circuit 30 detected at a timing (t2) that is a predetermined time period, such as a filtration time Tfil, after a timing (t1) at which the output voltage V0 starts changing from zero. This prevents an incorrect determination of whether or not there exists an abnormality in the parallel connection of high resistance resistors 26, 28. For example, the output voltage of the differential amplifier circuit 30 may be contaminated by noise caused by opening and closing the switching elements $S\alpha\beta$ of the inverter 12 or other operations. In such a case, even in the absence of an abnormality in the parallel connection of high resistance resistors 26, 28, for example, an output voltage V0 of the differential amplifier circuit 30 corresponding to an open fault in the resistor B may be detected momentarily at the timing t1 as shown in FIG. 4, which may lead to an incorrect determination that there exists an open fault in the resistor B. Normally, in the presence of an actual abnormality in the parallel connection of high resistance resistors 26, 28, an output voltage level corresponding to the abnormality will be kept for some time after the change of the output voltage of the differential amplifier circuit 30. Therefore, use of the output voltage V0 at the timing (t2) that is the filtration time Tfil after the timing (t1) at which the output voltage V0 starts changing from zero can prevent an incorrect determination of whether or not there exists an abnormality in the parallel connection of high resistance resistors 26, 28.

For example, after the microcomputer 22 has determined that there exists an abnormality in the parallel connection of high resistance resistors 26, 28, the microcomputer 22 may perform a fail-safe process in which a higher-level electronic control unit (ECU) than an ECU of the microcomputer 22 is notified that there exists an abnormality in the parallel connection of high resistance resistors 26, 28. This allows the higher-level ECU to be notified of the abnormality, and thus allows a user to be notified of the abnormality via the higher-level ECU.

The power conversion system in accordance with the second embodiment provides following additional advantages to the first embodiment.

(3) A potential difference between a specific one of the junctions (a first junction) of the high resistance resistor 26 and a specific one of the junctions (a second junction) of the high resistance resistor 28 is amplified by the differential amplifier circuit 30, where a potential difference between the first and second junctions is assumed to be zero when there exists no abnormality in the parallel connection of the high resistance resistors 26, 28. When it is determined that a value of the output voltage V0 of the differential amplifier circuit 30 is different from zero, that is, a value of the output voltage V0 of the differential amplifier circuit 30 is a positive or negative value, it is determined in the abnormality determination process that there exists an abnormality in at least one portion of the parallel connection of high resistance resistors 26, 28. This makes it possible to determine reliably whether or not there exists an abnormality in the parallel connection of high resistance resistors 26, 28, for example, even when the input voltage of the inverter 12 varies with time.

(4) When it is determined that there exists an abnormality in the parallel connection of high resistance resistors 26, 28, then a fail-safe process is performed. This prevents continuous use of the power conversion system with reduced reliability.

Third Embodiment

There will now be explained a power conversion system in accordance with a third embodiment of the present invention. Only differences of the third embodiment from the second embodiment will be explained.

Figure 5:
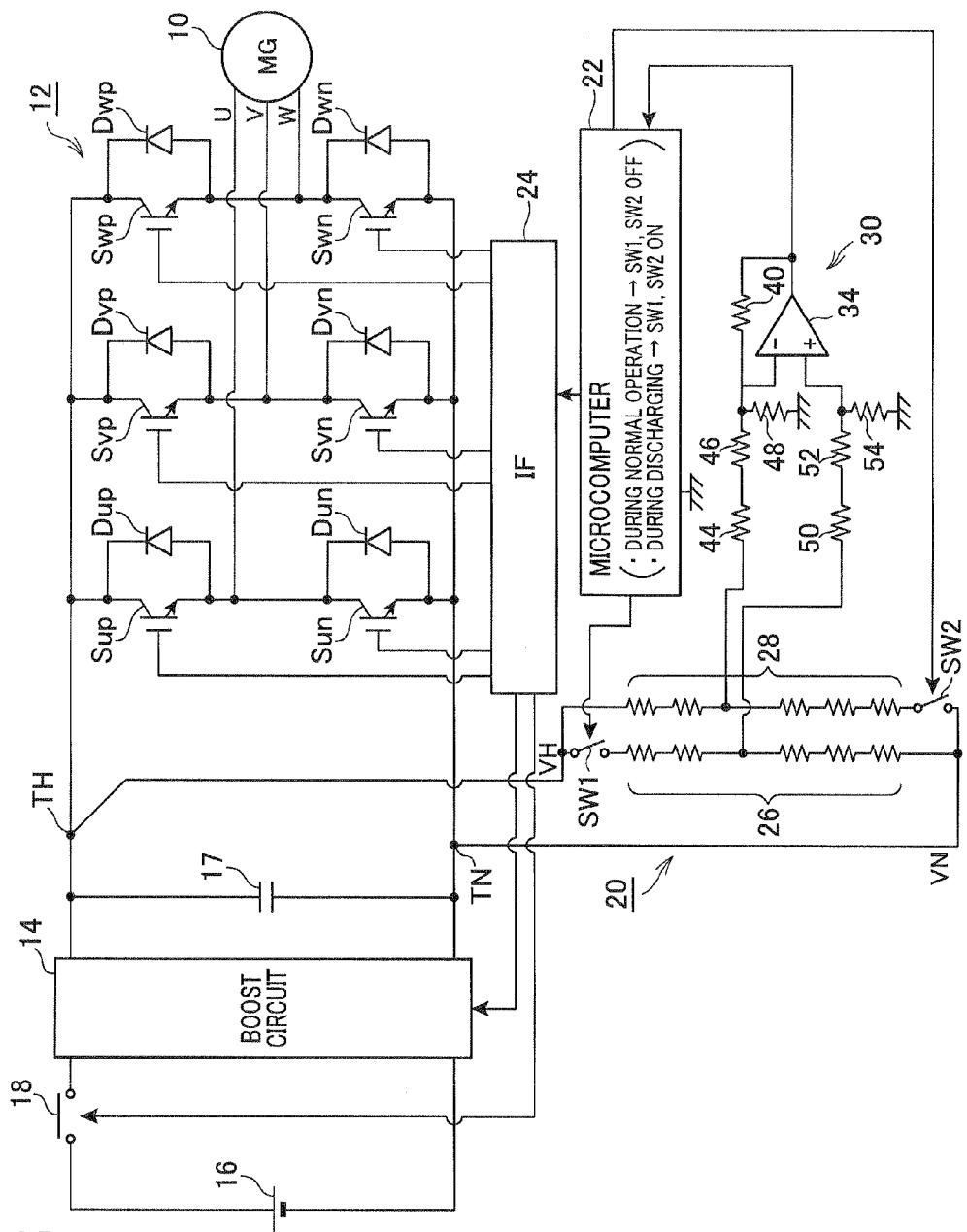
FIG. 5 schematically shows a power conversion system in accordance with a third embodiment of the present invention.

FIG. 5 schematically shows a power conversion system in accordance with the third embodiment.

In the present embodiment, the differential amplifier circuit 30 is used to perform the abnormality determination process for the parallel connection of high resistance resistors 26, 28. The differential amplifier circuit 30 is also used as voltage detection circuit to detect an input voltage of the inverter 12.

The voltage detection circuit is required for the microcomputer 22 to use the input voltage of the inverter 12 for generating an operation signal for each switching element. The voltage detection circuit converts the input voltage of the inverter 12 into a voltage that is applicable to the A/D converter in the microcomputer 22.

Since in the present embodiment a reference potential in the high-voltage system is different from a reference potential in the low-voltage system including the microcomputer 22, the differential amplifier circuit 30, as the voltage detection circuit, translates a potential of each terminal of the pair of input terminals of the inverter 12 into a potential relative to ground of the low-voltage system. More specifically, a potential VN of the negative input terminal TN that is the reference potential in the high-voltage system is lower than the reference potential in the low-voltage system. This is because in the present embodiment the reference potential in the low-voltage system is set at a median value of negative and positive potentials VH, VN of the capacitor 17. The translation can be accomplished by voltage dividing of each of voltages on the positive and negative terminals of the capacitor 17. The reference potential in the low-voltage system is a ground potential (a potential of the vehicle body).

More specifically, the $n^{th}$ junction (from the high side) of the high resistance resistor 28 that is a junction of the $n^{th}$ resistive element and the $(n+1)^{th}$ resistive element included in the high resistance resistor 28 is electrically connected to the inverting input terminal of the operational amplifier 34 through resistive elements 44 and 46 (n=2 in the present embodiment). A junction of the resistive element 46 and the inverting input terminal of the operational amplifier 34 is electrically connected to ground through a resistive element 48.

The $n^{th}$ junction (from the high side) of the high resistance resistor 26 that is a junction of the $n^{th}$ resistive element and the $(n+1)^{th}$ resistive element included in the high resistance resistor 26 is electrically connected to the non-inverting input terminal of the operational amplifier 34 through resistive elements 50 and 52 (n=2 in the present embodiment). A junction of the resistive element 52 and the non-inverting input terminal of the operational amplifier 34 is electrically connected to ground through a resistive element 54.

A total resistance value of the high resistance resistor 28 (for example, of the order of several kΩ) and a resistance value of the resistive element 48 (for example, of the order of several kΩ) are each much smaller than a total resistance value of a series connection of a portion of the high resistance resistor 28 and the resistive elements 44, 46 (for example, of the order of several MΩ) along an electrical pathway (a first electrical pathway) from the positive input terminal TH to the inverting input terminal of the operational amplifier 34.

In addition, a total resistance value of the high resistance resistor 26 (for example, of the order of several kΩ) and a resistance value of the resistive element 54 (for example, of the order of several kΩ) are also each much smaller than a total resistance value of a portion of the high resistance resistor 26 and the resistive elements 50, 52 (for example, of the order of several MΩ) along an electrical pathway (a second electrical pathway) from the negative input terminal TN to the non-inverting input terminal of the operational amplifier 34.

In the present embodiment, the portion of the high resistance resistor 28 is a series connection of the first and second resistive elements from the high side, and the portion of the high resistance resistor 26 is a series connection of the third to fifth resistive elements from the high side (or the first and second resistive elements from the low side).

A first electronically-controlled switch SW1 is provided along an electrical pathway (a third electrical pathway) between the positive input terminal TH and a high-side terminal of the high resistance resistor 26 to connect and disconnect this electrical pathway (the third electrical pathway). A second electronically-controlled switch SW2 is provided along an electrical pathway (a fourth electrical pathway) between the negative input terminal TN and a low-side terminal of the high resistance resistor 28 to connect and disconnect this pathway (the fourth electrical pathway). These switches SW1, SW2 are electronically-controlled by the microcomputer 22.

In the present embodiment, first and second switches SW1, SW2 are normally closed such that the first and second switches SW1, SW2 are energized to be turned on and de-energized to be turned off by the microcomputer 22.

With this configuration, when the differential amplifier circuit 30 is operating as the voltage detection circuit during normal operation of the inverter 12, the first and second switches SW1, SW2 are both energized to be open. A potential difference between a potential VH of the positive input terminal TH and a ground potential is then partitioned by a series connection of the portion of the high resistance resistor 28, the resistive element 44, and the resistive element 46 (that is a resistor formed of the portion of the high resistance resistor 28, the resistive element 44, and the resistive element 46) and the resistive element 48 so that the divided voltage is applied to the inverting input terminal of the operational amplifier 34. A potential difference between a potential VN of the negative input terminal TN and the ground potential is also partitioned by a series connection of the portion of the high resistance resistor 26, the resistive element 50, and the resistive element 52 (that is a resistor formed of the portion of the high resistance resistor 26, the resistive element 50, and the resistive element 52) and the resistive element 54 so that the divided voltage is applied to the non-inverting input terminal of the operational amplifier 34.

On the other hand, when the abnormality determination process for the parallel connection of high resistance resistors 26, 28 is performed or when the discharge control process is unable to be performed, then both the first and second switches SW1, SW2 are de-energized to be closed. This leads to formation of the discharge paths for the capacitor 17.

In the present embodiment, for example, a predetermined period (e.g., several hours) with which the first and second switches SW1, SW2 are closed is much longer than a period with which the control process or the like of the motor-generator 10 is performed. That is, a closed loop including the capacitor 17 and the parallel connection of the high resistance resistors 26, 28 is not normally formed. This can prevent the high resistance resistors 26, 28 from being normally connected in parallel with the high-voltage battery 16 and thereby reduce power consumption associated with a current flowing through the high resistance resistors 26, 28 from the high-voltage battery 16.

In the present embodiment, as described above, the differential amplifier circuit 30 is used not only for detecting the input voltage of the inverter 12, but also for performing the abnormality determination process for the parallel connection of high resistance resistors 26, 28. This can avoid the need for additional components for performing the abnormality determination process to thereby suitably suppress an increase in the number of components included in the discharge circuit 20 and can thereby suppress an increase in dimensions and an increase in manufacturing cost of the power conversion system including the discharge circuit 20.

Fourth Embodiment

There will now be explained a power conversion system in accordance with a fourth embodiment of the present invention. Only differences of the fourth embodiment from the second embodiment will be explained.

In the present embodiment, an abnormality determination process is performed by using comparators in place of the differential amplifier circuit.

Figure 6:
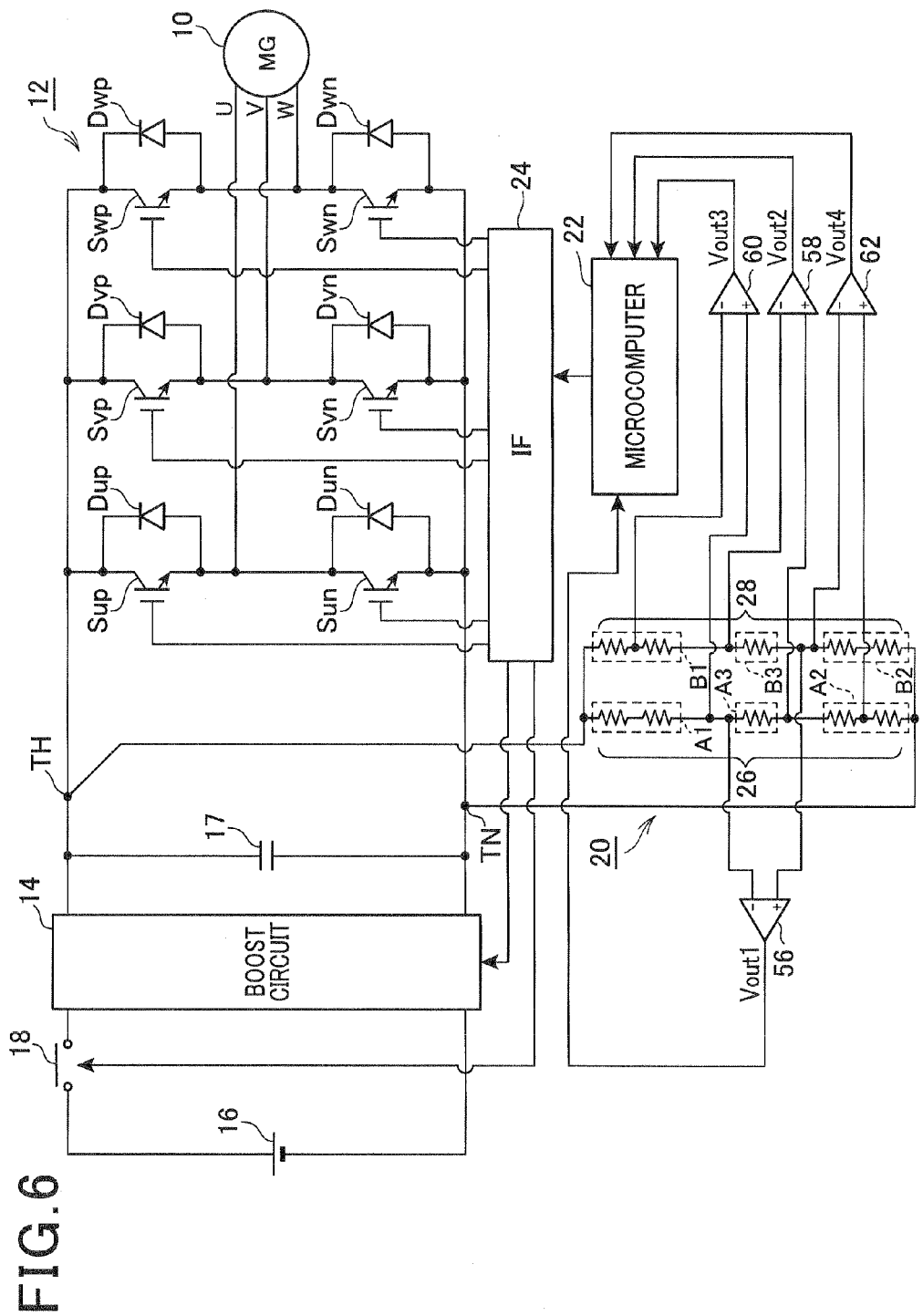
FIG. 6 schematically shows a power conversion system in accordance with a fourth embodiment of the present invention.

FIG. 6 schematically shows a power conversion system in accordance with the fourth embodiment.

In present embodiment, as shown in FIG. 6, the high resistance resistor 26 is a series connection of a series resistor A1, a resistive element A3, and a series resistor A2 arranged in this order from the high side. The high resistance resistor 28 is a series connection of a series resistor B1, a resistive element B3, and a series resistor B2 arranged in this order from the high side.

A junction of the series resistor A1 and the resistive element A3 is electrically connected to an inverting input terminal of a first comparator 56, and a junction of the resistive element B3 and the series resistor B2 is electrically connected to a non-inverting input terminal of the first comparator 56.

A junction of the series resistor B1 and the resistive element B3 is electrically connected to an inverting input terminal of a second comparator 58, and a junction of the resistive element A3 and the series resistor A2 is electrically connected to a non-inverting input terminal of the second comparator 58.

A junction of the series resistor B1 is electrically connected to an inverting input terminal of a third comparator 60, and a junction of the series resistor A1 and the resistive element A3 is electrically connected to a non-inverting input terminal of the third comparator 60.

A junction of the resistive element B3 and the series resistor B2 is electrically connected to an inverting input terminal of a fourth comparator 62, and a junction of the series resistor A2 is electrically connected to a non-inverting input terminal of the fourth comparator 62.

For simplicity, in the following, the series resistor A1, the resistive element A3, and the series resistor A2 may be referred to as a resistor A1, a resistor A3, and a resistor A2, respectively. The series resistor B1, the resistive element B3, and the series resistor B2 may be referred to as a resistor B1, a resistor B3, and a resistor B2, respectively.

Output voltages Vout 1 to Vout 4 of the first to fourth comparators 56 to 62 are applied to the microcomputer 22.

There will now be explained the abnormality determination process for the parallel connection of high resistance resistors 26, 28 in accordance with the present embodiment. In the present embodiment, it is determined on the basis of an output voltage of each comparator whether or not there exists an open fault in the parallel connection of high resistance resistors 26, 28.

FIG. 7 shows an exemplary relationship between occurrence of an open fault in each of the resistors A1 to A3 and B1 to B3 and the output voltages Vout 1 to Vout 4 of the first to fourth comparators.

As shown in FIG. 7, when there exists no abnormalities in either of the resistors A1 to A3 and B1 to B3, each of the first to fourth comparators 56 to 62 outputs a logic "L" voltage.

Upon occurrence of an open fault in the resistor A1 or in the resistor B2, only the output voltage Vout 1 of the first comparator 56 changes from the logic "L" voltage to a logic "H" voltage. That is, it is determined that the output voltage Vout 1 of the first comparator 56 has changed from the logic "L" voltage to the logic "H" voltage, then it is determined that there exists an open fault in the resistor A1 or in the resistor B2.

Upon occurrence of an open fault in the resistor A2 or in the resistor B1, the output voltage Vout 2 of the second comparator 58 changes from the logic "L" voltage to the logic "H" voltage. That is, it is determined that the output voltage Vout 2 of the second comparator 58 has changed from the logic "L" voltage to the logic "H" voltage, then it is determined that there exists an open fault in the resistor A2 or in the resistor B1.

Upon occurrence of an open fault in the resistive element A3, the output voltage Vout 3 of the third comparator 60 changes from the logic "L" voltage to the logic "H" voltage. It should be noted, however, that the output voltage Vout 3 of the third comparator 60 may also change from the logic "L" voltage to the logic "H" voltage upon occurrence of an open fault in the resistor A2 or in the high-side resistive element of the resistor B1. Therefore, it cannot be determined whether or not there exists an open fault in the resistive element A3 only on the basis of the output voltage Vout 3 of the third comparator 60.

Meanwhile, the output voltage Vout 2 of the second comparator 58 remains at the logic "L" voltage even in the presence of an open fault in the resistive element A3, while the output voltage Vout 2 of the second comparator 58 changes from the logic "L" voltage to the logic "H" voltage upon occurrence of an open fault in the resistor A2 or in the resistor B1. Therefore, when it is determined that the output voltage Vout 3 of the third comparator 60 has changed from the logic "L" voltage to the logic "H" voltage while the output voltage Vout 2 of the second comparator 58 remains at the logic "L" voltage, then it can be determined that there exists an open fault in the resistive element A3.

Upon occurrence of an open fault in the resistor B3, the output voltage Vout 4 of the fourth comparator 62 changes from the logic "L" voltage to the logic "H" voltage. It should be noted, however, that the output voltage Vout 4 of the fourth comparator 62 may also change from the logic "L" voltage to the logic "H" voltage upon occurrence of an open fault in the low-side resistive element of the resistor A2 or in the resistor B1. Therefore, it cannot be determined whether or not there exists an open fault in the resistor B3 only on the basis of the output voltage Vout 4 of the fourth comparator 62. As in the case of the open fault in the resistor A3, it can be determined whether or not there exists an open fault in the resistor B3 by using the output voltage Vout 2 of the second comparator 58. More specifically, when it is determined that the output voltage Vout 4 of the fourth comparator 62 has changed from the logic "L" voltage to the logic "H" voltage while the output voltage Vout 2 of the second comparator 58 remains at the logic "L" voltage, then it can be determined that there exists an open fault in the resistor A3.

As described above, in the present embodiment, it can be determined properly whether or not there exists an open fault in the parallel connection of high resistance resistors 26, 28 by using the output voltages Vout 1 to Vout 4 of the first to fourth comparators 56 to 62.

Fifth Embodiment

There will now be explained a power conversion system in accordance with a fifth embodiment of the present invention. Only differences of the fifth embodiment from the second embodiment will be explained.

Figure 8:
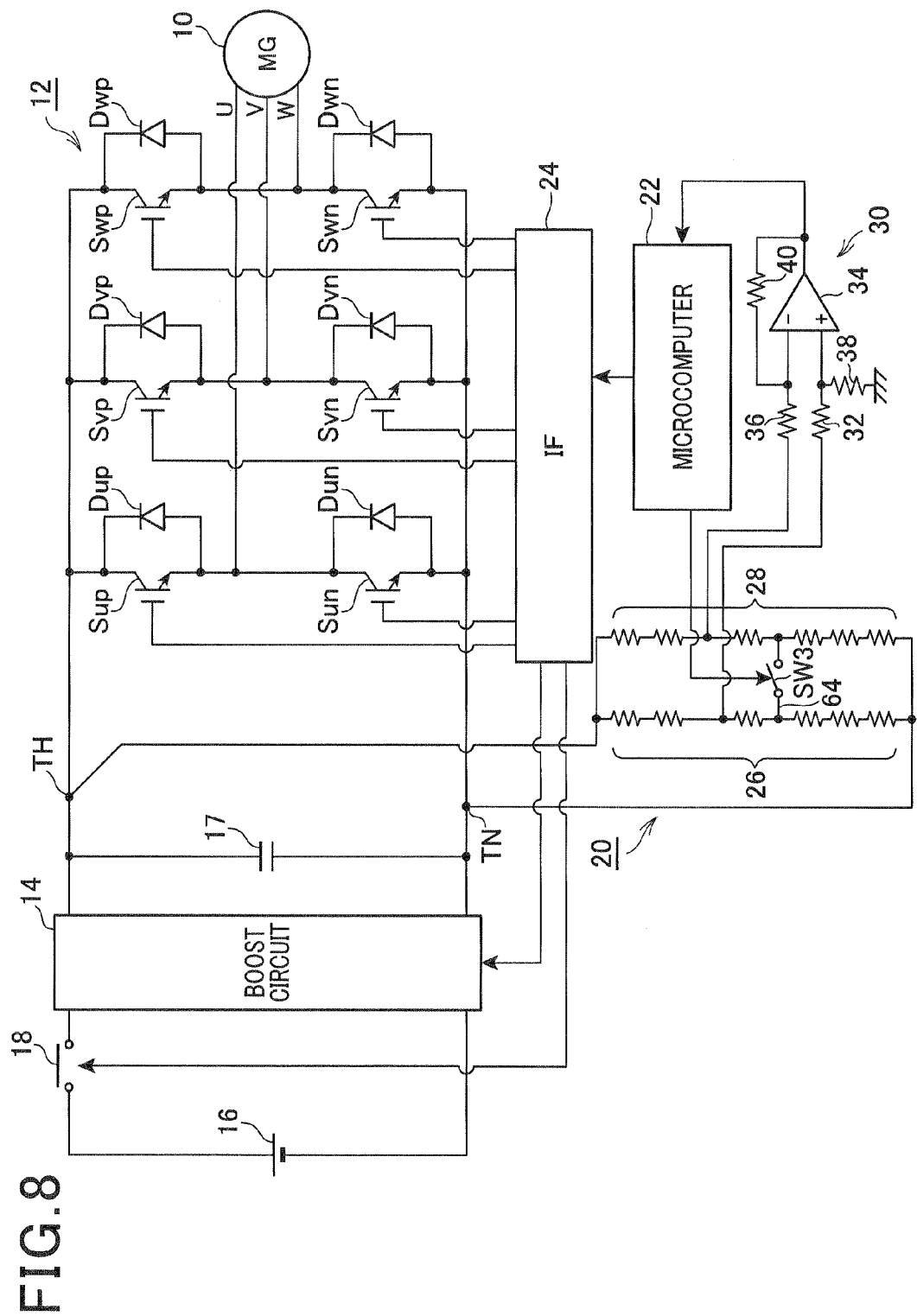
FIG. 8 schematically shows a power conversion system in accordance with a fifth embodiment of the present invention.

FIG. 8 schematically shows a power conversion system in accordance with the fifth embodiment. In the present embodiment, each of the high resistance resistors 26, 28 includes six resistive elements.

As shown in FIG. 8, a center one of junctions, at each of which mutually adjacent resistive elements of the high resistance resistor 26 are electrically connected, and a center one of junctions, at each of which mutually adjacent resistive elements of the high resistance resistor 28 are electrically connected, are electrically connected to each other via an electrical connection path 64. In the present embodiment, the center junction of each of the high resistance resistors 26, 28 is the third junction from the high side.

A switch SW3, which is provided along the electrical connection path 64, is electronically controlled by the microcomputer 22 (which serves not only as an abnormality determination unit, but also as a switch control unit) to open and close the electrical connection path 64.

When it is determined by the microcomputer 22 in the abnormality determination process that there exists an open fault in at least one portion of the parallel connection of high resistance resistors 26, 28, the microcomputer 22 closes the switch SW3. There will now be explained some merits arising from providing the electrical connection path 64 or the like.

Figure 9A:
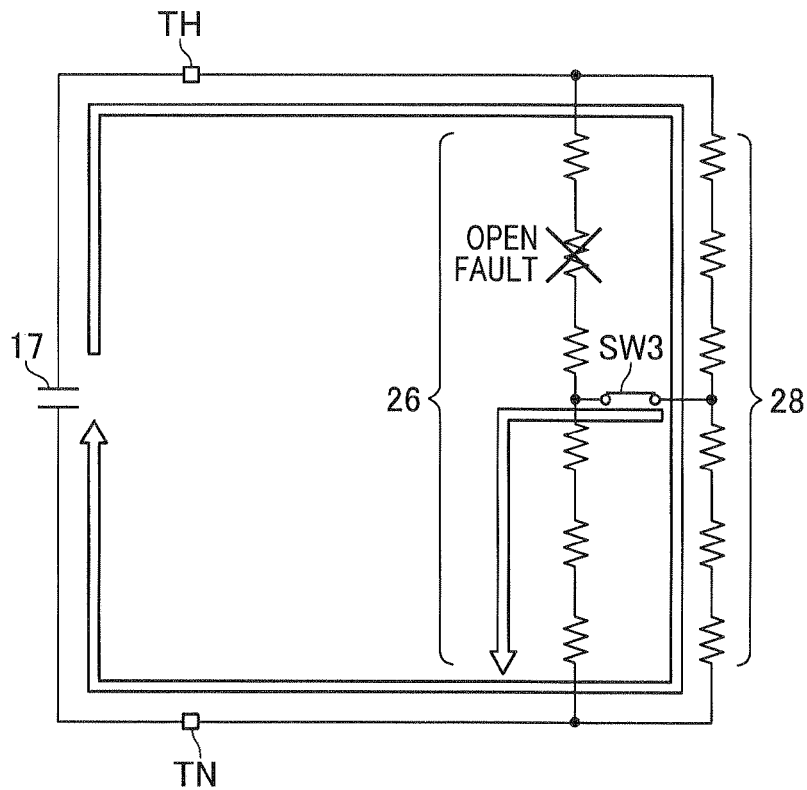
FIG. 9A schematically shows a formation of a first discharge path for a capacitor in accordance with the fifth embodiment.

Referring to FIG. 9A, it is assumed that there exists an open fault in one of the resistive elements forming the high resistance resistor 26 on the high side (i.e., the positive input terminal TH side) of the center junction. More specifically, in the example shown in FIG. 9A, there exists an open fault in the second resistive element, from the high side, of the high resistance resistor 26.

As shown in FIG. 9A, the switch SW3 is closed, which allows a series connection of resistive elements of the high resistance resistor 26 on the low side (i.e., the negative input terminal TN side) of the center junction to be used as a portion of a discharge path for the capacitor 17. In the example shown in FIG. 9A, the discharge path for the capacitor 17 is a branched discharge path. This can reduce a total resistance value of resistive elements along the discharge path for the capacitor 17 as compared to the case of a discharge path composed of the resistor 28 only. More specifically, in the example shown in FIG. 9A, the discharge path for the capacitor 17 is formed of a series connection of the first to third resistive elements, from the high side, of the high resistance resistor 28, and a parallel connection of the fourth to sixth resistive elements of the high resistance resistor 26 and the fourth to sixth resistive elements of the high resistance resistor 28. A total resistance value of the branched discharge path is smaller than a total resistance value of the resistor 28.

Figure 9B:
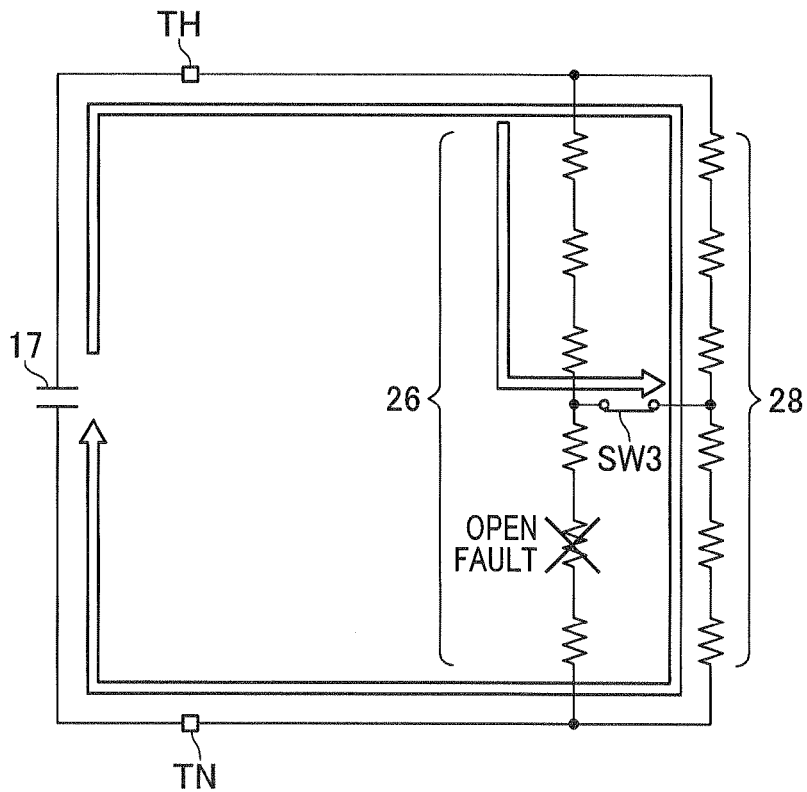
FIG. 9B schematically shows a formation of a second discharge path for a capacitor in accordance with the fifth embodiment.

Referring to FIG. 9B, it is assumed that there exists an open fault in one of the resistive elements forming the high resistance resistor 26 on the low side of the center junction. More specifically, in the example shown in FIG. 9B, there exists an open fault in the fifth resistive element, from the high side, of the high resistance resistor 26.

As shown in FIG. 9B, the switch SW3 is closed, which allows a series connection of resistive elements of the high resistance resistor 26 on the high side (i.e., the positive input terminal TH side) of the center junction to be used as a portion of a discharge path for the capacitor 17. As in the example shown in FIG. 9A, the discharge path for the capacitor 17 shown in FIG. 9B is a branched discharge path. This can also reduce a total resistance value of resistive elements along the discharge path for the capacitor 17 as compared to the case of a discharge path composed of the resistor 28 only. More specifically, in the example shown in FIG. 9B, the discharge path for the capacitor 17 is formed of a parallel connection of the first to third resistive elements (from the high side) of the high resistance resistor 26 and the first to third resistive elements of the high resistance resistor 28, and the fourth to sixth resistive elements of the high resistance resistor 28. A total resistance value of the branched discharge path is smaller than a total resistance value of the resistor 28.

In addition, the reduction in total resistance value along the discharge path for the capacitor 17 can suppress an increase in discharge time of the capacitor 17 and an increase in heat generation amount generated by a current flowing through some of the resistive elements forming the discharge circuit 20.

In the present embodiment, as described above, the center junction of the high resistance resistor 26 and the center junction of the high resistance resistor 28 are electrically connected to each other by the electrical connection path 64. With this configuration, it is more likely that a total resistance value of resistive elements along a discharge path for the capacitor 17 will be reduced to a larger extent in the presence of an open fault in at least one resistive element of the parallel connection of high resistance resistors 26, 28. Alternatively, for example, it may be assumed that the first junction, from the low side (i.e., the negative input terminal TN side), of the high resistance resistor 26, and the first junction, from the low side, of the high resistance resistor 28 are to be electrically connected to each other by an electrical connection path 64. Upon occurrence of an open fault in one of the resistive elements forming the high resistance resistor 26 on the high side of the first junction from the low side as in the example shown in FIG. 9A, the switch SW3 is closed. In this case, however, a total resistance value of resistive elements along a discharge path (which is formed of the first to fifth resistive elements, from the high side, of the high resistance resistor 28, and a parallel connection of the sixth resistive element of the high resistance resistor 26 and the sixth resistive element of the high resistance resistor 28.) for the capacitor 17 will be reduced to a smaller extent as compared to the example shown in FIG. 9A.

In the present embodiment, when it is determined in the abnormality determination process that there exists an abnormality in the parallel connection of high resistance resistors 26, 28, the switch SW3 is closed, which allows a total resistance value of resistive elements along the discharge path for the capacitor 17 to be reduced as compared to a total resistance value of a discharge path composed of either one of the high resistance resistors 26, 28. This can suppress an increase in discharge time of the capacitor 17 and an increase in heat generation amount generated by a current flowing through some of the resistive elements forming the discharge circuit 20.

(Modifications)

There will now be explained some modifications of each of the first to fifth embodiments that may be devised without departing from the spirit and scope of the present invention.

In each of the first to fifth embodiments, the discharge circuit 20 includes a parallel connection of two high resistance resistors 26, 28 each formed of a series connection of resistive elements, where the parallel connection of high resistance resistors is electrically connected between the pair of input terminals TH, TN of the inverter 12. Alternatively, the discharge circuit may include a parallel connection of three or more high resistance resistors each formed of a series connection of resistive elements, where the parallel connection of three or more high resistance resistors is electrically connected between the pair of input terminals TH, TN of the inverter 12. As in the second embodiment, one of N(N−1)/2 pairs of high resistance resistors (N: the number of the high resistance resistors) may be selected by a selection switch (not shown), and the selected pair of high resistance resistors are respectively connected to the inverting input terminal and to the non-inverting input terminal of the differential amplifier circuit 30.

In the second embodiment, the differential amplifier circuit 30 detects a potential difference between the positive input terminal TH and the negative input terminal TN of the inverter 12. Alternatively, the microcomputer 22 may directly receive a potential difference between the inverting input terminal and the non-inverting input terminal of the operational amplifier circuit 34 to detect the potential difference between the positive input terminal TH and the negative input terminal TN of the inverter 12.

In the second embodiment, the pair of high resistance resistors 26, 28 are electrically connected to the differential amplifier circuit 30, where the output voltage V0 of the differential amplifier circuit 30 takes different values as function of an abnormality in the parallel connection of high resistance resistors 26, 28 as shown in FIG. 3. With this configuration, which kind of abnormality (an open fault or a short-circuit fault) has occurred in which one of the resistors A to D can be identified.

In each of the first to fifth embodiments, the inverter 12 is electrically connected to the motor-generator 10 (as a prime mover) that is mechanically connected to a drive wheel (not shown). Alternatively, for example, the inverter may be an auxiliary inverter that is electrically connected to a rotating machine included in an air-conditioner compressor directly powered by the high-voltage battery 16. A parallel connection of a plurality of series connections of resistive elements is electrically connected between a pair of input terminals of the auxiliary inverter so that duplicated discharge paths are provided for a smoothing capacitor.

The power conversion circuit of the present invention is not limited to the inverter 12 as used in each of the first to fifth embodiments. The power conversion circuit of the present invention may include a DC/DC converter that steps down a voltage of the high-voltage battery 16 to output the stepped down voltage to a battery in a low-voltage system.

In each of the first to fifth embodiments, a vehicle to which the present invention is applied is a series hybrid vehicle or a parallel hybrid vehicle. Alternatively, a vehicle to which the present invention is applied may be an electrical vehicle or a fuel cell vehicle that doesn't mount therein any internal-combustion engine as a prime mover.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A capacitor discharger for a power conversion system including a DC voltage source, a power conversion circuit having a pair of first and second input terminals via which the DC voltage source is electrically connected to the power conversion circuit, and a capacitor electrically connected between the first and second input terminals of the power conversion circuit, the capacitor discharger comprising:

a parallel connection of first and second series connections of resistive elements electrically connected between the first and second input terminals of the power conversion circuit;

a voltage detection circuit configured to detect a potential difference between the first and second input terminals of the power conversion circuit on the basis of first and second voltages, the first voltage being a potential difference between a potential of the first input terminal of the power conversion circuit and a reference potential partitioned by using a portion of the second series connection of resistive elements and the second voltage being a potential difference between a potential of the second input terminal of the power conversion circuit and the reference potential partitioned by using a portion of the first series connection of resistive elements, the portion of the first series connection of resistive elements being a series connection of resistive elements between the second input terminal of the power conversion circuit and a first junction of resistive elements that is one of the junctions of resistive elements in the first series connection of resistive elements and the portion of the second series connection of resistive elements being a series connection of resistive elements between the first input terminal of the power conversion circuit and a second junction of resistive elements that is one of the junctions of resistive elements in the second series connection of resistive elements;

an abnormality determination unit configured to determine whether or not there exists an abnormality in the parallel connection of the first and second series connections of resistive elements on the basis of a potential difference between the first and second junctions of resistive elements; and a first electronically-controlled switch provided along a first electrical pathway between the first input terminal of the power conversion circuit and a first-input-terminal side end of the first series connection of resistive elements to connect and disconnect the first electrical pathway, and a second electronically-controlled switch provided along a second electrical pathway between the second input terminal of the power conversion circuit and a second-input-terminal side end of the second series connection of resistive elements to connect and disconnect the second electrical pathway, wherein during the voltage detection circuit detecting the potential difference between the first and second input terminals of the power conversion circuit, the first and second electronically-controlled switches are both open, and during the abnormality determination unit detecting the presence of an abnormality in the parallel connection of the first and second series connections of resistive elements, the first and second electronically-controlled switches are both closed, whereby the voltage detection circuit detects the potential difference between the first and second junctions of resistive elements and the abnormality determination unit determines whether or not there exists an abnormality in the parallel connection of the first and second series connections of resistive elements on the basis of the potential difference between the first and second junctions of resistive elements detected by the voltage detection circuit.

2. The capacitor discharger of claim 1, wherein the first and second junctions of resistive elements are such that, when there exists no abnormality in the parallel connection of the first and second series connections of resistive elements, the potential difference between the first and second junctions of resistive elements is zero when the first and second electronically-controlled switches are both closed.

3. The capacitor discharger of claim 1, wherein when there exists no abnormality in the parallel connection of the first and second series connections of resistive elements, a potential of the first junction of resistive elements is lower than a potential of the second junction of resistive elements,
the capacitor discharger further comprises a comparator that outputs a logic "L" voltage signal when a potential of the first junction of resistive elements is lower than a potential of the second junction of resistive elements and outputs a logic "H" voltage signal when a potential of the first junction of resistive elements is higher than a potential of the second junction of resistive elements,
wherein the abnormality determination unit determines whether or not there exists an abnormality in the parallel connection of the first and second series connections of resistive elements on the basis of whether or not an output voltage signal of the comparator has changed from the logic "L" voltage signal to the logic "H" voltage signal.

4. The capacitor discharger of claim 2, wherein the abnormality determination unit determines whether or not there exists an abnormality in the parallel connection of the first and second series connections of resistive elements on the basis of the potential difference between the first and second junctions of resistive elements at a timing that is a predetermined time period after a timing at which the potential difference between the first and second junctions of resistive elements starts changing from zero.

5. The capacitor discharger of claim 2, wherein when the first and second electronically-controlled switches are both closed, an output voltage of the voltage detection circuit takes different values each indicative of what kind of abnormality has occurred in which portion of the parallel connection of the first and second series connections of resistive elements, including a zero value indicative of no abnormality in the parallel connection of the first and second series connections of resistive elements, and
the abnormality determination unit determines what kind of abnormality has occurred in which portion of the parallel connection of the first and second series connections of resistive elements on the basis of the output voltage received from the voltage detection circuit.

6. The capacitor discharger of claim 2, wherein
the first and second series connections of resistive elements are each comprised of a mutually equal number of resistive elements,
a resistance value of each of the resistive elements forming the first series connection of resistive elements is equal to a resistance value of a respectively corresponding one of the resistive elements forming the second series connection of resistive elements, and
each of the first and second junctions is an $n^{th}$ junction (n: a positive integer smaller than the number of the resistive elements forming the first/second series connection of resistive elements), from one of the pair of first and second input terminals of the power conversion circuit, of the junctions of resistive elements of a respectively corresponding series connection of resistive elements.

7. The capacitor discharger of claim 2, further comprising:
an electronically-controlled switch provided along an electrical connection path between a pair of third and fourth junctions of resistive elements to open and close the electrical connection path, the third junction being one of junctions of resistive elements in the first series connection of resistive elements and the fourth junction being one of junctions of resistive elements in the second series connection of resistive elements; and
a switch control unit that controls the electronically-controlled switch so as to close the electrical connection path when it is determined by the abnormality determination unit that there exists an abnormality in the parallel connection of the first and second series connections of resistive elements.

8. The capacitor discharger of claim 7, wherein
the first and second series connections of resistive elements are each comprised of a mutually equal number of resistive elements,
a resistance value of each of the resistive elements forming the first series connection of resistive elements is equal to a resistance value of a respectively corresponding one of the resistive elements forming the second series connection of resistive elements,
each of the first and second junctions is a $n^{th}$ junction (n: a positive integer smaller than the number of the resistive elements forming the first/second series connection of resistive elements), from one of the pair of first and second input terminals of the power conversion circuit, of the junctions of resistive elements of a respectively corresponding series connection of resistive elements, and
each of the third and fourth junctions is a center junction of the junctions of resistive elements of a respectively corresponding series connection of resistive elements.

* * * * *